UNITED STATES PATENT OFFICE.

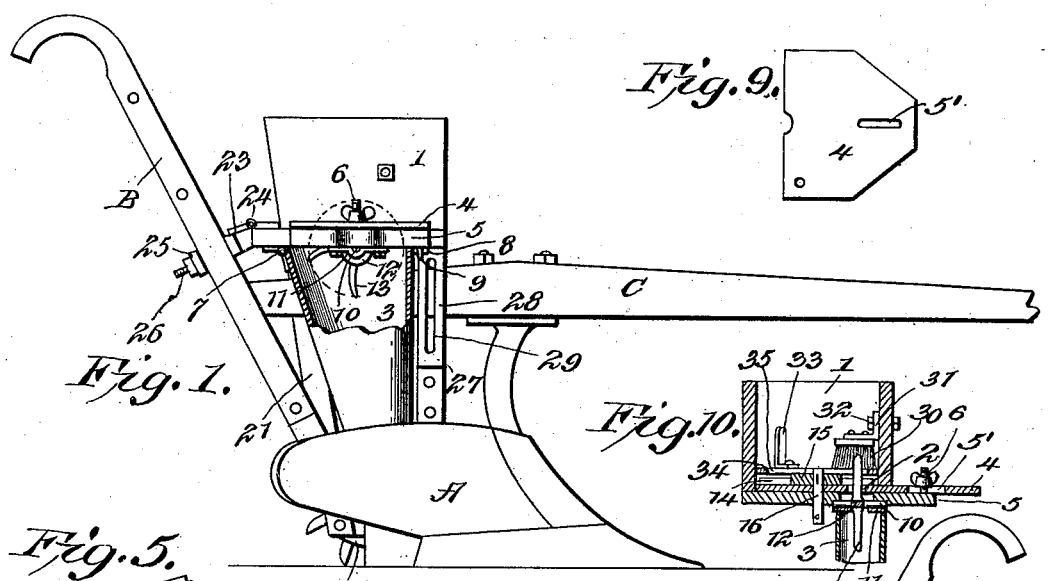

FRIEDRICH RIEWE, OF POTTSVILLE, TEXAS.

PLANTER ATTACHMENT FOR PLOWS.

SPECIFICATION forming part of Letters Patent No. 661,668, dated November 13, 1900.

Application filed June 22, 1900. Serial No. 21,211. (No model.)

*To all whom it may concern:*

Be it known that I, FRIEDRICH RIEWE, a citizen of the United States, residing at Pottsville, in the county of Hamilton and State of Texas, have invented a new and useful Combined Cotton, Corn, and Sugar-Cane Attachment for Plows, of which the following is a specification.

My invention is an improved combined cotton, corn, and sugar-cane planter attachment for plows, the object of my invention being to provide a simple, cheap, and automatically-operating planting attachment for plows which may be used for the planting of seeds of various kinds, as cotton, corn, sugar-cane, and the like, and which may be readily attached to and detached from a plow.

My invention consists in the peculiar construction and combination of devices hereinafter fully set forth, and pointed out in the claims.

In the accompanying drawings, Figure 1 is a side elevation, partly in section, of a planting attachment embodying my improvements, showing the same attached to a plow. Fig. 2 is a similar view showing the reverse side thereof. Fig. 3 is a rear elevation of my improved planter attachment, the same being detached from the plow. Fig. 4 is a top plan view of the same. Fig. 5 is a detail perspective view of the seed-brush. Figs. 6 and 7 are detail plan views of the corn-plate and sugar-cane plate, respectively. Fig. 8 is a similar view of the coacting bottom-plate of the hopper. Fig. 9 is a similar view of the cut-off or regulating plate. Fig. 10 is a detail sectional view taken on the line *a a* of Fig. 4.

In the embodiment of my invention I provide a seed-hopper 1, in the bottom of which, near one side, is a discharge-opening 2, through which the seeds pass to the seed-tube 3, that conveys them to the furrow. A cut-off plate 4 is disposed on a supporting-flange 5, that projects beyond one side of the seed-hopper, and said cut-off plate has an adjusting opening or slot 5', in which operates a set-screw 6, that serves to clamp the cut-off plate at any required adjustment. The function of the cut-off plate is to regulate the size of the discharge-opening 2. The seed-tube 3 is hinged at its rear side to the bottom of the hopper, as at 7, and is provided at its front side with a supporting-ear 8, which is maintained in a keeper 9. A shaft 10 is disposed transversely of the discharge-opening 2 and below the same and is journaled in suitable bearings 11, with which the bottom of the hopper is provided. A force-feed wheel 12 on the said shaft is provided with curved radial spurs 13, which operate in the discharge-opening 2 and coact with the spurs 14 of a cotton-seed-planting disk or plate 15, which is disposed on the bottom of the hopper and is fast to and rotates with the upper end of an operating-shaft 16. The said shaft 16 is flexible, being provided with and composed throughout the major portion of its length of a series of flexibly-jointed sections 17, the pivotal connections 18 of which are disposed at right angles to each other, whereby the said flexible shaft is adapted to bend in any direction. The said shaft has a lower section 19, which is horizontally disposed and is journaled in a bearing 20 at the lower end of a vertical frame 21, which depends from one side of the hopper 1 corresponding to the landside of the plow A, in connection with which the planter attachment is operated. At the outer end of the said horizontally-disposed section 19 of said shaft 16 is a traction-wheel 22, which is fast thereon and which by frictional contact with the earth when the machine is in operation causes the said shaft 16 to rotate and rotate the plate 15, which latter communicates rotary motion to the force-feed wheel, as will be understood. On the rear side of the hopper is hinged a transversely-disposed clamping-bar 23, as at 24. A clamping-bar 25, which is disposed parallel with the clamping-bar 23, is connected to the latter by an adjusting-bolt 26. The said clamping-bars 23 and 25 are adapted to be clamped, respectively, on the front and rear sides of the handle-bars B of the plow by means of the clamping-bolt 26, and, as shown in the drawings, the said clamping-bars serving as the means for attaching the hopper and the seed-planting mechanism connected thereto and carried thereby to the plow, as will be understood. On the inner side of the frame 21, at the front thereof, is a guide bracket 27, having a vertical arm 28, which is adapted to bear against one side of the plow-beam C, the frame 21 bearing against the opposite side thereof, and to adapt the attachment to be clamped securely to the plow-beam when the same is required I provide the frame 21 and the said arm 28 of guide-bracket 27 with slots 29 for the reception of clamping-bolts. Under usual conditions, however, such clamping-bolts are not required.

A brush 30 is disposed in the hopper in a position to bear upon the front portion of the discharge-opening 2 thereof and to brush the upper surfaces of the spurs 14 of the cotton-seed plate or disk 15 successively as said plate or disk rotates, thereby limiting the number of cotton-seeds fed by each of the said spurs to the said discharge-opening 2. The said brush is supported by an angle plate or bracket 31, which is bolted in one side of the hopper, as at 32. The cotton-seed disk or plate 15 is provided on its upper side with a vertically-disposed stirrer 33, the function of which is to prevent the cotton-seeds from lodging or arching in the hopper and to agitate the same continually while the machine is in operation to enable the seed plate or disk and coacting force-feed wheel to operate efficiently.

A false-bottom plate 34 in the seed-hopper bears upon the outer portions of spurs 14 of the plate or disk 15, the said false-bottom plate having a central opening 35 of sufficient size to uncover the said seed plate or disk 15 to the required extent.

By substituting the circular corn plate or disk 36 (shown in Fig. 6) for the cotton-seed disk or plate 15, hereinbefore described, the planter attachment is adapted for the planting of corn, and by using the sugar-cane seed plate or disk 37 (shown in Fig. 7) the planter attachment is adapted for use in planting the seeds of sugar-cane, as will be understood.

When the plates 36 37 are used, the force-feed wheel is detached from the planting mechanism, the same being only used in connection with the cotton-seed disk or plate, as hereinbefore stated.

It will be understood that in the operation of my improved planter attachment the plow opens the furrows into which the planting mechanism appropriately drops the seeds.

Having thus described my invention, I claim—

1. The combination with a plow having handle-bars B at the rear end of the beam, of a planting attachment comprising a hopper, clamping-bars on the rear side thereof, clamped on the front and rear sides of the handle-bars, and to which clamping-bars said hopper is flexibly connected, as by a hinge, a seed-spout depending from said hopper, a frame or support depending from said hopper, a traction-wheel carried by said frame or support, seed-dropping mechanism in said hopper and operating connections between said seed-dropping mechanism and said traction-wheel, substantially as described.

2. In a planter, the combination of a hopper, a revoluble seed-disk therein, a traction-wheel and a flexibly-jointed shaft rotated by said traction-wheel and to which said seed plate or disk is attached and by which said seed plate or disk is rotated, substantially as described.

In testimony that I claim the foregoing as my own I have hereto affixed my signature in the presence of two witnesses.

FRIEDRICH RIEWE.

Witnesses:
L. ALBRECHT,
HENRY REINERT.